United States Patent Office 3,356,678
Patented Dec. 5, 1967

3,356,678
DIBENZO-1,2-THIAZINES
Wilhelm E. Frick, Pfeffingen, and Guido Schetty, Aesch, Switzerland, assignors to J. R. Geigy A.G., Basel, Switzerland
No Drawing. Filed Mar. 25, 1966, Ser. No. 537,314
Claims priority, application Switzerland, Dec. 6, 1962, 14,325/62
16 Claims. (Cl. 260—243)

ABSTRACT OF THE DISCLOSURE

There are provided substituted 6H-dibenzo[c,e]-1,2-thiazine-5,5-dioxides of the general Formula I (I)

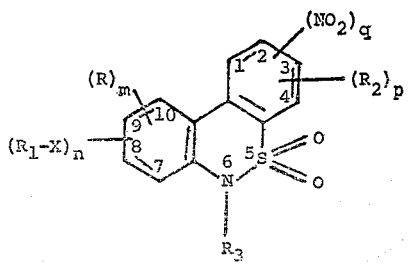

wherein the substituent variables are as defined in the specification. In addition, the alkali metal, alkaline earth metal and ammonium salts of the compounds falling under the above formula in which $R_3$ is hydrogen are provided. These compounds have been found to possess excellent insecticidal and acaricidal activity. The compounds are particularly effective against insects in all stages of development which injure keratin fiber, such as moth larvae as well as fur and carpet beetle larvae.

---

This application is a continuation-in-part of our copending application Serial No. 328,175, filed December 5, 1963, now abandoned.

The present invention concerns processes for the production of new insecticidally and acaricidally active dibenzo-1,2-thiazine derivatives.

It has now been found that substituted 6H-dibenzo[c,e]-1,2-thiazine-5,5-dioxides of the general Formula I (I)

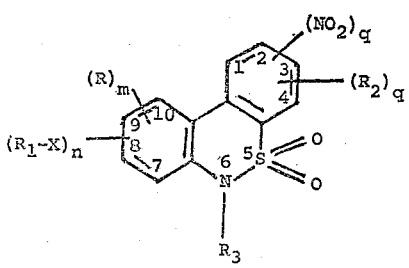

wherein the R's, independently of each other, represent halogen of an atom number ranging from 9 to 35, or trifluoromethyl, X represents an oxygen or sulfur atom, or an —SO— or —SO$_2$— group, $R_1$ represents lower alkyl, lower alkoxy-lower alkyl, halogeno-lower alkyl wherein halogen is of an atom number ranging from 9 to 35, hydroxy-lower alkyl, phenyl, lower alkyl-phenyl, halogeno-lower alkyl-phenyl wherein halogen is of an atom number ranging from 9 to 35, halogenophenyl wherein halogen is of an atom number ranging from 9 to 35, lower alkoxy-phenyl, nitrophenyl, amino-phenyl or hydroxyphenyl, The $R_2$'s, independently of each other, represent halogen of an atom number ranging from 9 to 35, or trifluoromethyl, $R_3$ represents hydrogen, lower alkyl, phenyl, lower alkyl-phenyl, halogeno-phenyl wherein halogen is of an atom number ranging from 9 to 35, halogeno-lower alkyl-phenyl wherein halogen is of an atom number ranging from 9 to 35, benzyl, lower alkyl-benzyl, halogeno-benzyl wherein halogen is of an atom number ranging from 9 to 35, and halogeno-lower alkyl-benzyl wherein halogen is of an atom number ranging from 9 to 35, lower alkanoyl, N,N-di(lower alkyl)-amino-lower alkyl or N-lower alkyl-amino-lower alkyl, benzoyl, or halogeno-benzoyl wherein halogen is of one of the atom numbers 9, 17 and 35, $n$ represents an integer ranging from 0 to 1, $p$ represents an integer ranging from 0 to 4, $m$ represents an integer ranging from 0 to $(4-n)$, and $q$ represents an integer ranging from 0 to 2, the sum of $m+n+p$ being at least equal to 1, and the sum of $p+q$ being not greater than 4, as well as the alkali metal salts, alkaline earth metal salts and ammonium salts of those compounds falling under Formula I in which $R_3$ is hydrogen, have surprisingly excellent insecticidal activity, in particular against insects in all stages of development which injure keratin fibers, such as moth larvae as well as fur and carpet beetle larvae.

Moreover the above-described compounds of Formula I, and especially those in which $R_3$ is lower alkyl are excellently suited for combatting insects and acarinae, but especially a stomach poison for insects devouring plants. The compound of Formula I have no significant phytotoxic properties.

The following insect families and orders can be combatted with particular success with insecticidal agents containing compounds of Formula I as active ingredients:

Diptera:
    Culicidae
    Muscidae
Orthoptera:
    Acrididae
    Blattidae
Coleoptera:
    Dermestidae
    Tenebrionidae
    Chrysomelidae
    Bruchidae
    Curculionidae
Lepidoptera:
    Pyralididae
    Noctuidae
Hymenoptera:
    Formicidae Compounds of Formula I also serve as active ingredients in acaricidal agents, particularly against the families Tetranychidae, Argasidae and Ixodidae of the Order Acarinae.

The compounds of Formula I according to the invention are distinguished by a pronounced activity as stomach poisons for insects devouring the leaves of plants. This is especially the case with certain divalent metal salts of the compounds falling under Formula I, as will be explained more in detail further below.

The compounds of the general Formula I draw from aqueous dispersions and, in the case of $R_3$ being hydrogen, also from aqueous solutions of their salts onto keratin fibers because of their affinity thereto and in this way they protect keratin material treated therewith from injury by the larvae of moths and other small winged insects as well as from injury by the larvae of fur and carpet beetles (Anthrenus and Attagenus).

Some of the new active ingredients are also active against termites and, in addition, some have bactericidal or bacteriostatic activity so that they can also be used for disinfection purposes.

Among the salts derived from compound of Formula I in which $R_3$ is hydrogen and from a divalent metal, those which are chlorinated 6H-dibenzo[c,e]-1,2-thiazine-5,5-dioxides containing per molecule a total of from one to maximally seven chlorine atoms and are members selected from among (a) dioxides as defined which are substituted in 7-position by a radical of the formula

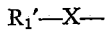

wherein X represents —O—, —S—, —SO—, or —SO$_2$—, and $R_1'$ represents phenyl, chlorine-substituted phenyl, trifluoromethyl-phenyl, lower alkyl-phenyl, hydroxy-phenyl, lower alkoxy-phenyl or amino-phenyl, and the 9-position of which is occupied by hydrogen or chlorine, and (b) Dioxides as defined which are substituted in 9-position by phenoxy or chlorophenoxy, and the 7-position of which is occupied by hydrogen, the 2- and 10-positions of which dioxides as defined under (a) and (b) supra are each occupied by hydrogen or chlorine, the 3-position of which dioxides is occupied by hydrogen, chlorine, nitro, or trifluoromethyl, and the nitrogen atom in 6-position of which dioxides is occupied by one equivalent of divalent calcium, manganese or zinc, are distinguished particularly from the corresponding free acids and the alkaline metal salts, but also from other salts of divalent metals such as iron, strontium, barium, mercury, copper or cadmium by a very rapid inset of full insecticidal action against such noxious insects as the larvae of Colorado beetle and locusts, against which a rapid inset is of vital importance for the saving of the crops. Thus spraying with an aqueous carrier containing only 0.1 g. per liter of the above mentioned zinc, calcium or manganese salt achieves a 100% killing of Leptinotarsa larvae while the sodium or potassium salt or the free 7-(p-chlorophenoxy)-10-chloro-6H-dibenzo[c,e]-1,2-thiazine - 5,5 - dioxide applied in the same concentration, affords a 100% kill only after 24 hours or later.

Another class of particularly active compounds according to the invention, also falling under Formula I, comprises halogenated 6H-dibenzo[c,e]-1,2-thiazine - 5,5 - dioxides of which dioxides, the 1-position is occupied by hydrogen or chlorine,
the 2-position is occupied by hydrogen, chlorine, bromine, or fluorine,
the 3-position is occupied by hydrogen, chlorine, bromine or nitro,
the 8-position is occupied by hydrogen, chlorine, trifluoromethyl or, lower alkylthio,
each of the 7- and 9-positions is occupied by hydrogen, halogen of an atom number ranging from 9 to 35, trifluoromethyl or a radical of the formula

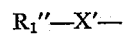

wherein X' represents —O— or —S—, and
$R_1''$ represents lower alkyl, lower alkoxy-lower alkyl, hydroxy-lower alkyl or chloro-lower alkyl,
and the nitrogen atom in 6-position is substituted by lower alkyl, lower alkyl-substituted amino-lower alkyl, phenyl, lower alkyl-phenyl, halogenophenyl wherein halogen has an atomic number ranging from 9 to 35, trifluoromethyl-phenyl, halogenobenzyl wherein halogen has an atomic number ranging from 9 to 35, and trifluoromethyl benzyl, or, in free acid form, by hydrogen, the said dioxides containing per molecule at least two and maximally seven halogen atoms of an atomic number ranging from 9 to 35, and, when the 6-position is occupied by hydrogen, at least two but not more than four of the positions 1, 2, 3, 7, 8, 9 and 10 of said molecule are occupied by hydrogen.

Those active ingredients falling under the general Formula I are particularly active against larvae of moths, carpet and fur beetles, which are substituted in the c-fused benzo radical by one radical of the formula

wherein X' represents oxygen or sulfur and
$R_1'$ represents phenyl, halogeno-phenyl, wherein halogen is of an atomic number ranging from 9 to 35, and halogeno-lower alkyl-phenyl wherein halogen is of an atomic number ranging from 9 to 35, while the e-fused ring is either unsubstituted or substituted with from 1 to 4 substituents $R_2$, and wherein $R_3$, in Formula I, is hydrogen. These compounds serve thus particularly as insecticides in the protection of keratin materials.

Optional results in this respect are obtained with those compounds in which the $R_1'$—X'— substituent is in o-position to the nitrogen bond (7-position). Of this subclass of compounds falling under Formula I those which are further substituted by halogen, have proved to be particularly active when they contain the halogen atom in p-position to the nitrogen bond (9-position) in the c-fused benzo radical.

The new 6H-dibenzo[c,e]-1,2-thiazine,5,5-dioxides of the general Formula I, which can also be termed substituted 2,2'-diphenyl sultams, are produced by a first process by diazotising a substituted 2-aminobenzene sulphonic acid anilide of the general Formula II

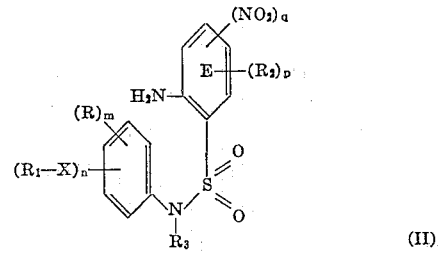

wherein R, $R_1$, $R_2$, $R_3$, X, $m$, $n$, $p$ and $q$ have the meanings given above, decomposing the diazonium salt formed in the presence of a heavy metal catalyst such as copper powder whereby a direct bond between the C atom in the o-position of the benzene sulphone radical and the C atom in the o-position of the aniline radical is formed. The diazotisation is performed in the usual way, preferably in a mixture of glacial acetic acid and concentrated hydrochloric acid.

The diazonium salt is decomposed preferably in an acetic acid aqueous solution, buffered for example, with sodium acetate, in the presence of a copper powder as catalyst.

A second process for the production of 6H-dibenzo[c,e]-1,2-thiazine-5,5 - dioxides of the general Formula I consists in treating a substituted 2-(o-aminophenyl)-benzene-1-sulphonic acid of the general Formula III

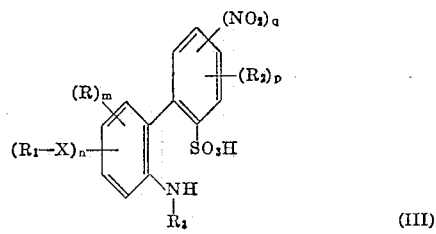

wherein R, $R_1$, $R_2$, $R_3$, X, m, n, p, and q have the meanings given above, or a halide, particularly the chloride, of such an acid with agents which split off water or hydrogen halide.

Examples of agents which split off water are: concentrated sulphuric acid, phosphorus pentachloride, phosphorus trichloride, phosphorus oxychloride, thionyl chloride etc. as well as mixtures thereof. Agents which split off hydrogen halide are tertiary organic nitrogen bases such as pyridine and dimethyl aniline and inorganic bases such as aqueous sodium hydroxide or sodium hydroxide suspended in organic solvents or salts having a basic reaction such as alkali carbonates etc.

The reaction products obtained by both variations of the process wherein $R_3$ is hydrogen can then be reacted in the presence of an acid binding agent or after conversion into an alkali metal compound, with a reactive ester, particularly a halogen hydracid ester, of an alcohol of the general formula $R_3'$—OH, wherein $R_3'$ has the meaning given above for $R_3$ with the exception of hydrogen or phenyl. Alkyl halides and dimethyl sulphate particularly are mentioned as esters of such alcohols.

For the purpose of introducing halogen or to increase the halogen content in the compounds produced as given above by the two variations of the process, if desired these compounds, which already correspond to Formula I, can be reacted with chlorine or bromine until one or more chlorine or bromine atoms have entered the molecule as nuclear substituents. This subsequent halogenation can be performed in the usual way in the presence of suitable solvents and optionally adding a catalyst such as iron powder, iron chloride etc.

The starting materials of the general Formula II for the first process mentioned are obtained, insofar as they are not already known, by methods known per se by reacting an o-nitrobenzene sulphonic acid chloride which may be substituted by halogen and/or trifluoromethyl with an aromatic amine which may be suitably substituted such as aniline, N-alkyl aniline, aminodiphenyl ether, diphenylamine etc., and reducing the nitro group in the nitrobenzene sulphonic acid anilide formed to the amino group by known methods, e.g. with catalytically activated hydrogen or with iron according to Béchamp.

It is also possible to condense o-aminobenzene sulphochloride or its nuclear halogenated or nuclear trifluoromethylated derivatives with an aniline which may be substituted, e.g. in the presence of pyridine, to form the corresponding o-aminobenzene sulphonic acid anilides.

The following compounds, for example, are suitable starting materials of the general Formula II:

2-aminobenzene sulphonic acid-4'-chloroanilide,
2-amino-3,5-dichlorobenzene sulphonic acid-4'-chloroanilide,
2-amino-3,5-dichlorobenzene sulphonic acid-3'-trifluoromethyl anilide,
2-amino-3,5-dichlorobenzene sulphonic acid-4'-chloro-3'-trifluoromethyl anilide,
2-amino-5-chlorobenzene sulphonic acid-3',4'-dichloroanilide,
2-amino-5-chlorobenzene sulphonic acid-5'-chloro-2'-(p-chlorophenoxy)-anilide,
2-amino-3,5-dichlorobenzene sulphonic acid-4',5'-dichloro-2'-(3'',4''-dichlorophenoxy)-anilide,
2-amino-4,5-dichlorobenzene sulphonic acid-2'-ethoxy-4',5'-dichloroanilide,
2-amino-5-chlorobenzene sulphonic acid-N-methyl-3',4'-dichloroanilide.

Starting materials (2 - aminodiphenyl - 2' - sulphonic acids) of the general Formula III are obtained, for example, by diazotising o-aminobenzene sulphonic acids which may be suitably further substituted and reacting the diazonium salts with suitably substituted acetanilides in the presence of copper powder and subsequently saponifying the acetylamino group. Also diphenyls which may be suitably substituted can be used as starting materials. These are converted into the corresponding 2-aminodiphenyl-2'-sulphonic acids by nitrating and sulphonating to form the corresponding 2-nitrodiphenyl-2'-sulphonic acids and reducing the nitro group in the latter.

The following compounds, for example, are suitable starting material of the general Formula III:

2-aminodiphenyl-2'-sulphonic acid,
2-amino-3,5-dichloro-diphenyl-2'-sulphonic acid,
2-amino-4,4'-dichloro-diphenyl-2'-sulphonic acid,
2-amino-4-bromo-diphenyl-2'-sulphonic acid,
2-amino-4,5-dichloro-diphenyl-2'-sulphonic acid,
2-amino-5-chloro-3-phenoxy-diphenyl-2'-sulphonic acid,
2-amino-5-chloro-3-(p-chlorophenoxy)-diphenyl-2'-sulphonic acid,
2-amino-3-ethoxy-4,5-dichloro-diphenyl-2'-sulphonic acid.

In the case where the starting material contains 1 or 2 nitro groups in the e-ring, the reduction cannot be carried out according to the method of Béchamp, nor with catalytically activated hydrogen, but must be carried out with sodium sulfide.

The following non-limitative examples further illustrate the production of the new 6H-dibenzo[c,e]-1,2-thiazine-5,5-dioxides. Parts and percentages are given therein by weight and the temperatures are in degrees centigrade.

*Example 1—Production of 2,3,7,9,10-pentachloro-6H-dibenzo[c,e]-1,2-thiazine-5,5-dioxide*

(a) *2-amino-4,5-dichlorobenzene sulfonic acid 2',4',5'-trichloroanilide.*—26 parts of 2-amino-4,5-dichlorobenzene sulfonic acid chloride are gradually added to a solution of 20 parts of 2,4,5-trichloroaniline and 16 parts of pyridine in 200 parts of benzene. Care is taken, by cooling, that the temperature does not rise above 10° C. On completion of the addition of all the sulfonic acid chloride, the mixture is left to itself for several hours at 20° C. and then worked up as follows: the pyridine is removed with dilute hydrochloric acid and the benzene solution is washed neutral with water, dried and concentrated. The residue is dissolved with sodium hydroxide solution and the reaction product is again precipitated with acid, filtered off under suction and recrystallized from ethanol. It melts at 153–155°.

The same compound is obtained if 2-nitro-4,5-dichlorobenzene sulfonic acid chloride is condensed in the usual way with 2,4,5-trichloroaniline and the nitro compound is reduced by one of the known methods, e.g. with iron and hydrochloric acid according to Béchamp.

(b) *2,3,7,9,10-pentachloro-6H-dibenzo [c,f] - 1,2-thiazine-5,5-dioxide.*—41.8 parts of 2-amino-4,5-dichlorobenzene sulfonic acid-2',4',5'-trichloroanilide are dissolved in 400 parts of glacial acetic acid, 25 parts by volume of concentrated hydrochloric acid are added and the whole is diazotized in the usual way, i.e. at about 0–10°, with a solution of 7 parts of sodium nitrite in 20 parts of water.

The resultant diazo solutions is then poured into a previously prepared 40° warm solution of 200 parts of sodium acetate in 300 parts of water in which 10 parts of Cu powder are suspended. There is an immediate energetic development of nitrogen; an immediate and thorough mixture is attained by intensive stirring. As the greasy compound which precipitates contains copper, a further 20 parts of Cu powder must be added in portions during the reaction in order to maintain the reaction. When no more nitrogen is generated, the reaction mixture is made strongly alkaline with sodium hydroxide solution. The hot solution is filtered and the crude 2,3,7,9,10-pentachloro-6H-dibenz[c.e][1,2]thiazine-5,5-dioxide is precipitated from the filtrate. It is filtered off under suction and dried at 100° C. in vacuo. The compound can be purified by recrystallisation from alcohol. In the pure state it melts at 240–242°.

*Example 2—Production of 6-methyl-7-(p-chlorophenoxy)-9,10-dichloro-6H-dibenzo[c,e][1,2]thiazine-5,5-dioxide*

(a) *7-(p-chlorophenoxy)10-chloro - 6H - dibenzo[c,e][1,2]thiazine-5,5-dioxide.*—42.5 parts of 4,4'-dichloro-2-[o-aminobenzene sulphonamido]-diphenyl ether are dissolved in 300 parts of glacial acetate acid, and 25 parts by volume of concentrated hydrochloric acid are added to the solution. The suspension of the hydrochloride formed is diazotised at 0–10° with a solution of 7 parts of sodium nitrite in 20 parts of water. The solution of the diazonium compound is clarified by filtration and then poured into a 60° warm solution of 200 parts of sodium acetate in 300 parts of water which contains 10 parts of Cu powder. On completion of the nitrogen development, the reaction mixture is kept for some time at 60° and then made strongly alkaline with sodium hydroxide solution and filtered. The 7-(p-chlorophenoxy)-10-chloro-6H-dibenzo[c,e][1,2]thiazine-5,5-dioxide is precipitated from the filtrate with hydrochloric acid. The precipitate is filtered off and dried in vacuo at about 100°. The substance is obtained in a pure form by recrystallisation from ethanol; it melts at 180–182°.

(b) *7-(p-chlorophenoxy)-9,10-dichloro - 6H - dibenzo[c,e][1,2]-thiazine-5,5-dioxide.*—39.2 parts of 7-(p-chlorophenoxy)-10-chloro - 6H - dibenzo[c,e][1,2]thiazine-5,5-dioxide are suspended in 250 parts of glacial acetic acid and about 8 parts of chlorine are introduced at 30–35°. The chlorination mixture is diluted with water and the product is filtered off under suction. After drying in vacuo at 100° its melting point is between 220–225°. If it is recrystallised from ethanol, then a pure compound is obtained which melts at 229–231° and which, on exact determination of the constitution is found to be 7-(p-chlorophenoxy)-9,10-dichloro - 6H - dibenzo[c,e][1,2]thiazine-5,5-dioxide.

(c) *6 - methyl-7-(p-chlorophenoxy)-9,10-dichloro-6H-dibenzo[c,e][1,2]thiazine-5,5-dioxide.*—42.6 parts of 7-(p-chlorophenoxy)-9,10-dichloro - 6H - dibenzo[c,e][1,2]thiazine-5,5-dioxide are dissolved in 500 parts of 2 N sodium hydroxide solution. 20 parts of dimethyl sulphate are added to this solution and the whole is stirred for several hours at 70–80°. At the end of this time, the N-methyl derivative which has precipitated is filtered off under suction and dried at 100° in vacuo. On recrystallisation from ethanol, the pure 6-methyl-7-(p-chlorophenoxy)-9,10-dichloro - 6H - dibenzo[c,e][1,2]thiazine-5,5-dioxide is obtained.

The following compounds of general Formula I are also produced by the methods described in the above examples from equivalent amounts of the corresponding starting materials:

*Examples*

(3) Heptachloro-9-phenoxy - 6H - dibenzo[c,e][1,2]thiaazine-5,5-dioxide (mixture, formed by subsequent chlorination of 9-phenoxy-6H-dibenz[c,e][1,2]thiazine-5,5-dioxide at 60–70° C.), (4) 7-phenoxy-10-chloro-6H-dibenzo[c,e][1,2]thiazine-5,5-dioxide, (5) 2,3,9-trichloro-6H-dibenzo[c,e][1,2]thiazine-5,5-dioxide, (6) 2,3,8,9-tetrachloro-6H-dibenzo[c,e][1,2]thiazine-5,5-dioxide, (7) 2,3,8-trichloro-6H-dibenzo[c,e][1,2]thiazine-5,5-dioxide, (main component of a chlorination mixture obtained by chlorination of 2,3-dichloro-6H-dibenzo[c,e][1,2]thiazine-5,5-dioxide), (8) 2,3,9-trichloro-8-trifluoromethyl-6H-dibenzo[c,e][1,2]thiazine-5,5-dioxide, (9) 2,3,8,9,10-pentachloro-6H-dibenzo[c,e][1,2]thiazine-5,5-dioxide,

(10) 6-methyl-2,3,9-trichloro-6H-dibenzo[c,e][1,2]thiazine-5,5-dioxide,

(11) 6-methyl-2,3,8,9,10-pentachloro-6H-dibenzo[c,e][1,2]thiazine-5,5-dioxide,

(12) 7-(2',4',6'-trichlorophenoxy)-2,3,10-trichloro-6H-dibenzo[c,e][1,2]thiazine-5,5-dioxide,

(13) 7-(2',4',5'-trichlorophenoxy)-2,10-dichloro-6H-dibenzo[c,e][1,2]thiazine-5,5-dioxide,

(14) 7-(p-chlorophenoxy)-2,3,10-trichloro-6H-dibenzo[c,e][1,2]thiazine-5,5-dioxide,

(15) 7-(chlorophenoxy)-2,10-dichloro-6H-dibenzo[c,e][1,2]thiazine-5,5-dioxide,

(16) 2-chloro-8,10-bis-(trifluoromethyl)-6H-dibenzo[c,e][1,2]thiazine-5,5-dioxide,

(17) 2,3,9,10-tetrachloro-7-methoxy-6H-dibenzo[c,e][1,2]thiazine-5,5-dioxide,

(18) 6-ethyl-2,3,9-trichloro-6H-dibenzo[c,e][1,2]thiazine-5,5-dioxide,

(19) 2,3,9,10-tetrachloro-6H-dibenzo[c,e][1,2]thiazine-5,5-dioxide,

(20) 2,3,9,10-tetrachloro-7-(3',4',-dichlorophenoxy)-6H-dibenzo[c,e][1,2]thiazine-5,5-dioxide,

(21) 2,3,9,10-tetrachloro-7-(2',4',5'-trichlorophenoxy)-6H-dibenzo[c,e][1,2]thiazine-5,5-dioxide,

(22) 2,3-dichloro-9-(3',4'-dichlorophenoxy)-6H-dibenzo[c,e][1,2]thiazine-5,5-dioxide,

(23) 2,3-dichloro-9-(p-chlorophenoxy)-6H-dibenzo[c,e][1,2]thiazine-5,5-dioxide,

(24) 6-methyl-7-(p-chloro-phenoxy)-10-chloro-6H-dibenzo[c,e][1,2]thiazine-5,5-dioxide,

(25) 9-methoxy-2,3-dichloro-6H-dibenzo[c,e][1,2]thiazine-5,5-dioxide,

(26) 9-methylthio-2,3-dichloro-6H-dibenzo[c,e][1,2]thiazine-5,5-dioxide,

(27) 7-methoxyethoxy-1,2,3,9-tetrachloro-6H-dibenzo[c,e][1,2]thiazine-5,5-dioxide,

(28) 9-(β-chloroethyl-thio)-2,3,4,7-tetrachloro-6-methyl-6H-dibenzo[c,e][1,2]thiazine-5,5-dioxide,

(29) 9-(β-hydroxyethoxy)-2,3,4,7-tetrachloro-6-methyl-6H-dibenzo[c,e][1,2]thiazine-5,5-dioxide,

(30) 7-phenylthio-9-chloro-6-isopropyl-6H-dibenzo[c,e][1,2]thiazine-5,5-dioxide,

(31) 7-(p-methylphenylthio)-9-chloro-6-ethyl-6H-dibenzo[c,e][1,2]thiazine-5,5-dioxide,

(32) 7-(m-trifluoromethyl-p-chloro-phenoxy)-6H-dibenzo[c,e][1,2]thiazine-5,5-dioxide,

(33) 2,3,9,10-tetrachloro-7-(p-chloro-phenylthio)-6H-dibenzo[c,e][1,2]thiazine-5,5-dioxide,

(34) 2-chloro-3-trifluoromethyl-7-(p-methoxy-phenoxy)-6H-dibenzo[c,e][1,2]thiazine-5,5-dioxide,

(35) 9-(p-nitro-phenoxy)-2,3-dichloro-6H-dibenzo[c,e][1,2]thiazine-5,5-dioxide,

(36) 3-nitro-7,8,9-trichloro-6H-dibenzo[c,e][1,2]thiazine-5,5-dioxide,

(37) 3-nitro-7-(p-chloro-phenoxy)-6H-dibenzo[c,e][1,2]thiazine-5,5-dioxide,

(38) 7-(p-amino-phenoxy)-2,3-dichloro-6H-dibenzo[c,e][1,2]thiazine-5,5-dioxide,

(39) 7-(p-hydroxyphenoxy)-2-chloro-6H-[c,e][1,2]thiazine-5,5-dioxide,

(40) 7-(p-chlorophenylsulfonyl)-2,3,9-trichloro-6H-dibenzo[c,e][1,2]thiazine-5,5-dioxide,

(41) 7-(3',4'-dimethyl-phenyl-sulfoxido)-2,3-dichloro-6H-dibenzo[c,e][1,2]thiazine-5,5-dioxide,

(42) 6-(p-bromo-phenyl)-2,3-dibromo-6H-dibenzo[c,e][1,2]thiazine-5,5-dioxide,

(43) 6-phenyl-7,9-dibromo-6H-dibenzo[c,e][1,2]thiazine-5,5-dioxide,

(44) 6-(3',4'-dimethyl-phenyl)-7,9-dichloro-6H-dibenzo[c,e][1,2]thiazine-5,5-dioxide,

(45) 6-(m-trifluoromethyl-phenyl)-7,9-dichloro-6H-dibenzo[c,e][1,2]thiazine-5,5-dioxide,

(46) 6-benzyl-9-phenoxy-2,3-dichloro-6H-dibenzo[c,e][1,2]thiazine-5,5-dioxide,

(47) 6-(p-methyl-benzyl)-7-(p-chloro-phenoxy)-6H-dibenzo[c,e][1,2]thiazine-5,5-dioxide,

(48) 6-(3',4'-dichloro-benzyl)-7-(p-chlorophenyl-thio)-2,10-dichloro-6H-dibenzo[c,e][1,2]thiazine-5,5-dioxide,

(49) 6-(m-trifluoromethyl-p-chloro-benzyl)-6H-dibenzo[c,e][1,2]thiazine-5,5-dioxide,
(50) 6-acetyl-7-(p-chlorophenoxy)-9,10-dichloro-6H-dibenzo[c,e][1,2]thiazine-5,5-dioxide,
(51) 6-(2',4'-dichloro-benzoyl)-7-(p-chlorophenoxy-9,10-dichloro-6H-dibenzo[c,e][1,2]thiazine-5,5-dioxide,
(52) 6-benzoyl-7-(p-chlorophenylthio)-9,10-dichloro-6H-dibenzo[c,e][1,2]thiazine-5,5-dioxide,
(53) 6-(γ-N,N-dimethylaminopropyl)-2,3,9,10-tetrachloro-6H-dibenzo[c,e][1,2]thiazine-5,5-dioxide,
(54) 6-(β-methylamino-ethyl)-2,3,9,10-tetrachloro-6H-dibenzo[c,e][1,2]thiazine-5,5-dioxide,
(55) Heptachloro - 7-phenoxy-6H-dibenzo[c,e][1,2]thiazine-5,5-dioxide (mixture, formed by subsequent chlorination of 7-phenoxy-6H-dibenzo[c,e][1,2]thiazine-5,5-dioxide, at 60–70° C.),
(56) 2,9-difluoro-8-trifluoromethyl-6H-dibenzo[c,e][1,2]thiazine-5,5-dioxide.

*Example 57*

Example 2 is repeated but the strongly alkaline solution obtained by adding sodium hydroxide solution after completion of the nitrogen development and standing of the reaction mixture for about 30 minutes, is filtered and then concentrated in vacuo until the sodium salt of 7-(p-chlorophenoxy)-10-chloro-6H-dibenzo[c,e][1,2]thiazine - 5,5-dioxide precipitates. The salt is separated by filtration and purified by recrystallization from ethanol.

*Example 58*

Example 2 is repeated but the strongly alkaline solution obtained by adding sodium hydroxide solution after completion of the nitrogen development and standing of the reaction mixture for about 30 minutes, is filtered and saturated aqueous calcium chloride solution is added thereto, whereupon the calcium salt of the formula

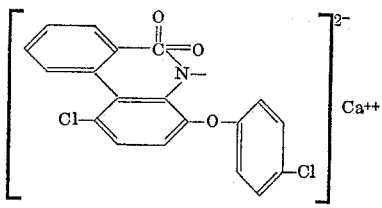

precipitates. It is separated by filtration from the mother liquor and washed with cold water. It is very slightly soluble even in hot water and does not melt up to 300°.

*Example 59*

100 parts of 7-(p-chlorophenoxy)-10-chloro-6H-dibenzo[c,e][1,2]thiazine-5,5-dioxide are dissolved in an aqueous sodium hydroxide solution produced by dissolving 10 parts of caustic soda in 3000 parts of water, with stirring and heating to 90°. 10 parts of active carbon are then stirred into the hot solution and stirring is continued for about 5 minutes. The hot solution of the sodium salt of the starting dibenzothiazine-dioxide is then filtered through hyflo under suction, and a clear tea-colored filtrate is obtained to which 150 parts by volume of ethanol are added while stirring, the latter being continued until the liquid has cooled to about 50°. A solution prepared by dissolving 20 parts of CaCl$_2$.2H$_2$O in 50 parts of water is then added to the 50° warm liquid with strong stirring. Precipitation of the calcium salt of 7-(p-chlorophenoxy)-10-chloro-6H-dibenzo[c,e][1,2]thiazine-5,5-dioxide begins immediately. Crystallization is facilitated by seeding with a few crystals of the calcium salt prepared in a previous run.

The reaction mixture is then cooled to room temperature (20° C.), the tan-colored crystals are separated by suction filtration, then ground while still wet, to set free occluded mother liquor, the latter is removed by suction filtration and the crystalline filter cake is then washed thoroughly with cold water. The calcium salt is then dried in a vacuum drying chamber at 70° until the water content has been reduced to at least about 2%.

The manganese salt and the zinc salt of 7-(p-chlorophenoxy) - 10 - chloro-6H-dibenzo[c,e][1,2]thiazine-5,5-dioxide are prepared by repeating the above procedure but using instead of 20 parts of calcium chloride an equivalent amount of anhydrous manganese dichloride, MnCl$_2$, or zinc chloride, respectively.

The compounds of the Formula I can be applied in various forms, e.g. as dusts, wettable powders, emulsions or oil solutions. In combination with synergists and auxiliaries having a similar action, such as substances of DDT-type activity, olive oil, peanut oil, phosphoric acid esters etc., a wider spectrum of biological activities is attained.

The compounds according to the invention described hereinbefore, and particularly those defined in connection with the substituent R$_1$'—X'—, can be used according to the usual methods for textile finishing. They have affinity to keratin material and are excellently suitable, therefore, for the protection of such materials from injury by insects, in particular they are suitable for the wash and light fast moth proofing of such materials both in the raw as well as in the processed state, for example of raw or processed sheep's wool as well as other animal hairs, fells and furs. In addition to the wash and light fast moth proofing in the dyebath, the compounds can also be used for the impregnation of wool and woollen articles in dry cleaning processes, the materials then becoming equally excellently moth proofed.

In addition to their insecticidal action on the larvae of the clothes moth, the compounds of the general Formula I possess such an action on the fur and carpet beetle. The textiles treated in any way desired with the compounds according to the invention such as woollen blankets, woollen carpets, woollen underwear, woollen clothes and knitted goods, are thus protected from the usual types of insects which are injurious to keratin material.

The agents used for the protection of keratin materials from injury due to insects should contain the active ingredients of Formula I in finely distributed form. Thus, solutions, suspensions and emulsions of the active ingredients are particularly suitable for use.

Insofar as the compounds contain a hydrogen atom in the sulfonamide group, i.e. when R$_3$ is a hydrogen atom, in the form of their alkali metal salts they generally have good water-solubility. They can be applied to the keratin material direct from these aqueous solutions, either by dipping the material for a shorter or longer time in the alkali metal salt solutions, or spraying them with the solutions, or by treating them in the solutions at a raised temperature as in dyeing processes.

Compounds having no dissociating hydrogen atom in the sulfonamide group can be drawn onto the material to be protected for example from their aqueous suspensions or emulsions, advantageously at a raised temperature, or such suspensions or emulsions can be used for spraying the material.

Because of their improved solubility in organic solvents, these compounds are particularly well suited for application from non-aqueous media. Thus the materials to be protected can simply be impregnated with these solutions, or, if a suitable solvent is chosen, the moth-proof finishing can be combined with a dry-cleaning process.

Propylene glycol, methoxyethanol, ethoxyethanol and dimethyl formamide have been found to be particularly good organic solvents to which distributing agents, emulsifying agents such sulfonated ricinus oil, sulfite waste liquor and fatty alcohol sulfates are particularly suitable for this aspect of the invention involving the protection of keratinous materials.

The following non-limitative examples describe the production of various forms suitable for application in practice. The parts and percentages are given therein by weight.

EXAMPLE I 0.5 part of 7-(p-chlorophenoxy)-9,10-dichloro-6H-dibenzo[c,e][1,2]thiazine-5,5-dioxide are dissolved in 10 parts of 0.1 N sodium hydroxide solution and a little ethanol. This solution is diluted with 3000 parts of water and 100 parts of wool are treated in this liquor for 15 minutes at 60°. 5 parts of 10% acetic acid are added and the treatment at 60° is continued for another hour. The wool is then rinsed in the usual way and dried. On being tested, the wool is found to be resistant to attack by moth larvae, fur and carpet beetle larvae.

EXAMPLE II

The following process, for example, can be used for the application of 6-methyl-7-(p-chlorophenoxy)-9,10-dichloro - 6H - dibenzo[c,e][1,2]thiazine - 5,5 - dioxide:

0.5 part of active ingredient are dissolved in 10 parts of dimethyl formamide and the solution is poured into 3000 parts of water which contains about 1–2 parts of an emulsifying agent, e.g. sulfonated ricinus oil.

100 parts of wool are treated in this liquor for 30 minutes at the boil. After rinsing and drying, the wool is found to be moth-proofed.

Naturally, in the treatment baths in Examples I and II, other auxiliaries as well as dyestuffs can be added.

EXAMPLE III

First a 20% solution of 6-methyl-7-(p-chlorophenoxy)-9,10-dichloro-6H-dibenzo[c,e][1,2]thiazine-5,5-dioxide in glycol monomethyl ether is prepared. 10 parts by volume of this solution are diluted with 200 parts by volume of a solvent suitable for dry cleaning, e.g. a suitable benzine fraction ("Diluan S"). If desired, cleansing additives can be added. The woollen articles are then treated in this cleaning liquid in the usual way and then squeezed out to a content of solvent of about 100% of the weight of the wool. After drying, they are found to be moth-proofed.

Baths of the same or analogous composition can also be used in an analogous manner for the moth proofing of untreated articles or of articles which have been treated in any way or cleaned.

Similar mixtures can also be used for spraying or sprinkling on wool in any stage of processing.

The keratin textile materials treated with the compounds according to the invention are tested as to their resistance to attack by pests by the following standardized methods:

Moths: SNV leaflet (Swiss Association for Standardization) No. 95901,
Carpet beetles, (Anthrenus): SNV leaflet No. 95902,
Fur beetles, (Attagenus): AATCC (American Association of Textile Chemists & Colorists) Year Book 1952 p. 123 ff.

EXAMPLE IV

*Spray:*

(a) 2 parts of 6-methyl-7-(p-chlorophenoxy)-9,10-dichloro-6H-dibenzo[c,e][1,2]thiazine-5,5-dioxide are dissolved in 10 parts of xylene and 88 parts of petroleum.

(b) 2 parts of the above active compound and 3 parts of 1,1-bis-(p-chlorophenyl)-2,2,2-trichloroethane are dissolved in 10 parts of xylene or another auxiliary solvent and 85 parts of petroleum.

Both solutions are excellently suitable, for example, for combatting insects by spraying in houses as well as in store rooms and slaughter houses.

EXAMPLE V

*Dust.*—2 parts of 9-phenoxy-heptachloro-6H-dibenzene[c,e][1,2]thiazine-5,5 dioxide produced as described in Example 3 are mixed instantly by milling with 5 parts of Aerosil and 93 parts of talcum. This dust can be used, for example, for combatting pests particularly on clothes, carpets and the like woolen articles in the household or in the storage rooms.

EXAMPLE VI

*Strewing agent.*—2 parts of 6-methyl-7-(p-chlorophenoxy) - 10 - chloro - 6H - dibenzene[c,e][1,2]triazine-5,5-dioxide are mixed with 20 parts of kaolin and 78 parts of talcum. This strewing agent is suitable for all uses where a finely pulverised material is of the type described in the preceding example unsuitable because of dust formation.

We claim:

1. A chlorinated 6H-dibenzo[c,e]-1,2-thiazine-5,5-dioxide containing per molecule a total of from one to maximally seven chlorine atoms and being a member selected from
   (a) a dioxide as defined which is substituted in 7-position by a radical of the formula $R_1'$—X—
      wherein X is a member selected from the group consisting of —O—, —S—, —SO—, and —SO$_2$—, and
      $R_1'$ is a member selected from the group consisting of phenyl, chlorine-substituted phenyl, trifluoromethyl-phenyl, lower alkyl-phenyl, hydroxy-phenyl, lower alkoxy-phenyl and amino-phenyl,
   (b) a dioxide as defined which is substituted in 9-position by a member selected from the group consisting of phenoxy, chlorophenoxy and nitrophenoxy, and
   the 3-position of the said dioxide under (a) and (b) supra being substituted by a member selected from the group consisting of hydrogen, chlorine, nitro, and trifluoromethyl, and
   the nitrogen atom in the 6-position in said dioxide under (a) and (b) supra being substituted by a member selected from the group consisting of lower alkyl, lower alkanoyl, benzyl, lower alkylbenzyl, chlorobenzyl, benzoyl chloro-benzoyl and hydrogen, and the alkali metal salt, alkaline earth metal salt, and ammonium salt thereof when the nitrogen atom in the 6-position is substituted with hydrogen.

2. A chlorinated 6H-dibenzo[c,e]-1,2-thiazine-5,5-dioxide containing per molecule a total of from one to maximally seven chlorine atoms and being a member selected from among
   (a) a dioxide as defined which is substituted in 7-position by a radical of the formula $R_1'$—O— and
      $R_1'$ represents phenyl, chlorine-substituted phenyl, trifluoromethyl-phenyl, lower alkyl-phenyl, hydroxy-phenyl, lower alkoxy-phenyl or amino-phenyl, and
   (b) a dioxide as defined which is substituted in 9-position by phenoxy or chlorophenoxy, and the 7-position of which is occupied by hydrogen,
   the 3-position of the said dioxide as defined under (a) and (b), supra, being occupied by hydrogen, chlorine, nitro, or trifluoromethyl, and
   the nitrogen atom in 6-position in said dioxide being substituted by lower alkyl, lower alkanoyl, benzyl, lower alkylbenzyl, chloro-benzyl, benzoyl or chlorobenzoyl, or in free acid form, by hydrogen.

3. A member selected from the group consisting of heptachlorinated 9-phenoxy-6H-dibenzo[c,e]-1,2-thiazine-5,5-dioxide and the 6-methylated derivative thereof.

4. A member selected from the group consisting of heptachlorinated 7-phenoxy-6H-dibenzo[c,e]-1,2-thiazine-5,5-dioxide and the 6-methylated derivative thereof.

5. A chlorinated 6H-dibenzo[c,e]-1,2-thiazine-5,5-dioxide as defined in claim 1, wherein $R_1'$—O— represents p-chloro-phenoxy, in 7-position, each of the 9- and 10-positions are occupied by chlorine, and each of the 2-, 3- and 6-positions are occupied by hydrogen.

6. A chlorinated 6H-dibenzo[c,e]-1,2-thiazine-5,5-dioxide as defined in claim 1, wherein $R_1'$—O— represents p-chloro-phenoxy, in 7-position, each of the 9- and 10-positions are occupied by chlorine, and each of the 2- and 3-positions are occupied by hydrogen, and the 6-position is occupied by methyl.

7. A chlorinated 6H-dibenzo[c,e]-1,2-thiazine-5,5-dioxide as defined in claim 1, wherein $R_1'$—O— represents p-chloro-phenoxy, in 7-position, the 10-position is occupied by chlorine, and each of the 2-, 3-, 6- and 9-positions is occupied by hydrogen.

8. A chlorinated 6H-dibenzo[c,e]-1,2-thiazine-5,5-dioxide as defined in claim 1, wherein $R_1'$—O— represents p-chloro-phenoxy, in 7-position, the 10-position is occupied by chlorine, each of the 2-, 3- and 9-positions is occupied by hydrogen, and the 6-position is occupied by methyl.

9. A chlorinated 6H-dibenzo[c,e]-1,2-thiazine-5,5-dioxide containing per molecule a total of from one to maximally seven chlorine atoms and being a member selected from among (a) a dioxide as defined which is substituted in 7-position by a radical of the formula $R_1'$—O— and $R_1'$ represents phenyl, chlorine-substituted phenyl, trifluoromethyl-phenyl, lower alkyl-phenyl, hydroxyphenyl, lower alkoxy-phenyl or amino-phenyl, and the 9-position of which is occupied by hydrogen or chlorine, and (b) a dioxide as defined which is substituted in 9-position by phenoxy or chlorophenoxy, and the 7-position of which is occupied by hydrogen, the 2- and 10-positions of the dioxide as defined under (a) and (b) supra being each occupied by hydrogen or chlorine, the 3-position of the said dioxide being occupied by hydrogen, chlorine, nitro, or trifluoromethyl, and the nitrogen atom in 6-position in said dioxide being substituted by an alkali metal or ammonium ion.

10. A chlorinated 6H-dibenzo[c,e]-1,2-thiazine-5,5-dioxide containing per molecule a total of from one to maximally seven chlorine atoms and being a member selected from among (a) a dioxide as defined which is substituted in 7-position by a radical of the formula $R_1'$—O— and $R_1'$ represents phenyl, chlorine-substituted phenyl, trifluoromethyl-phenyl, lower alkyl-phenyl, hydroxyphenyl, lower alkoxy-phenyl or amino-phenyl, and the 9-position of which is occupied by hydrogen or chlorine, and (b) a dioxide as defined which is substituted in 9-position by phenoxy or chlorophenoxy, and the 7-position of which is occupied by hydrogen, the 2- and 10-positions of the dioxide as defined under (a) and (b) supra being each occupied by hydrogen or chlorine.

the 3-position of the said dioxide being occupied by hydrogen, chlorine, nitro, or trifluoromethyl, and the nitrogen atom in 6-position in said dioxide being substituted by one equivalent of divalent metal ion.

11. A chlorinated 6H-dibenzo-[c,e]-1,2-thiazine-5,5-dioxide as defined in claim 10, wherein said divalent metal is selected from among calcium, zinc and manganese.

12. A chlorinated 6H-dibenzo-[c,e]-1,2-thiazine-5,5-dioxide as defined in claim 10, wherein said divalent metal is calcium.

13. 7-(p-chlorophenoxy)-9,10-dichloro - 6H - dibenzo-[c,e][1,2]thiazine-5,5-dioxide.

14. 6-methyl-7-(p-chlorophenoxy) - 9,10 - dichloro-6H-dibenzo[c,e][1,2]thiazine-5,5-dioxide.

15. 7-(p - chlorophenoxy) - 10 - chloro - 6H - dibenzo-[c,e][1,2]thiazine-5,5-dioxide.

16. 6-methyl-7-(p-chlorophenoxy) - 10 - chloro-6H-dibenzo[c,e][1,2]thiazine-5,5-dioxide.

References Cited

UNITED STATES PATENTS

| | | | |
|---|---|---|---|
| 3,198,793 | 8/1965 | Hilger et al. | 260—243 |
| 3,210,348 | 10/1965 | Rey-Bellet et al. | 260—243 |

WALTER A. MODANCE, *Primary Examiner.*

JOHN M. FORD, *Assistant Examiner.*